(12) United States Patent
Bacon et al.

(10) Patent No.: US 7,984,083 B2
(45) Date of Patent: *Jul. 19, 2011

(54) GARBAGE COLLECTOR WITH EAGER READ BARRIER

(75) Inventors: David Francis Bacon, Sleepy Hollow, NY (US); Perry Cheng, New York City, NY (US); Vadakkedathu Thomas Rajan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,423

(22) Filed: Jun. 25, 2010

(65) Prior Publication Data

US 2010/0262636 A1 Oct. 14, 2010

Related U.S. Application Data

(63) Continuation of application No. 10/751,793, filed on Jan. 5, 2004, now Pat. No. 7,747,659.

(51) Int. Cl.
*G06F 17/30* (2006.01)
*G06F 12/02* (2006.01)

(52) U.S. Cl. ..................................................... 707/816
(58) Field of Classification Search .................... 707/816
See application file for complete search history.

(56) References Cited

U.S. PATENT DOCUMENTS

| 5,175,856 | A | * | 12/1992 | Van Dyke et al. | 717/151 |
|---|---|---|---|---|---|
| 5,179,702 | A | * | 1/1993 | Spix et al. | 718/102 |
| 5,687,368 | A | * | 11/1997 | Nilsen | 1/1 |
| 5,867,649 | A | * | 2/1999 | Larson | 709/201 |
| 5,930,807 | A | * | 7/1999 | Ebrahim et al. | 1/1 |
| 6,128,775 | A | * | 10/2000 | Chow et al. | 717/156 |
| 6,195,676 | B1 | * | 2/2001 | Spix et al. | 718/107 |
| 6,397,379 | B1 | * | 5/2002 | Yates et al. | 717/140 |
| 6,463,582 | B1 | * | 10/2002 | Lethin et al. | 717/158 |
| 6,529,515 | B1 | * | 3/2003 | Raz et al. | 370/401 |
| 6,539,541 | B1 | * | 3/2003 | Geva | 717/150 |
| 6,549,959 | B1 | * | 4/2003 | Yates et al. | 710/22 |
| 6,671,707 | B1 | * | 12/2003 | Hudson et al. | 1/1 |
| 6,678,742 | B1 | * | 1/2004 | Muramatsu et al. | 719/310 |
| 6,779,107 | B1 | * | 8/2004 | Yates | 712/229 |
| 6,789,181 | B1 | * | 9/2004 | Yates et al. | 712/4 |
| 6,836,782 | B1 | * | 12/2004 | Fresko et al. | 1/1 |
| 6,874,074 | B1 | * | 3/2005 | Burton et al. | 711/170 |
| 6,934,832 | B1 | * | 8/2005 | Van Dyke et al. | 712/244 |
| 7,000,227 | B1 | * | 2/2006 | Henry | 717/152 |
| 7,047,394 | B1 | * | 5/2006 | Van Dyke et al. | 712/209 |
| 7,065,633 | B1 | * | 6/2006 | Yates et al. | 712/227 |
| 7,069,421 | B1 | * | 6/2006 | Yates et al. | 712/209 |
| 7,107,419 | B1 | * | 9/2006 | Ghemawat et al. | 711/162 |
| 7,111,290 | B1 | * | 9/2006 | Yates et al. | 717/158 |
| 7,146,352 | B2 | * | 12/2006 | Brundage et al. | 1/1 |

(Continued)

*Primary Examiner* — Mark Andrew X Radtke
(74) *Attorney, Agent, or Firm* — Michael J. Buchenhorner; Vazken Alexanian

(57) ABSTRACT

A garbage collection system that needs to meet real-time requirements uses an eager read barrier that performs a forwarding operation as soon as a quantity is loaded. The barrier maintains a to-space invariant by including a forwarding pointer in the header of objects to be moved or accessed that normally points to the object itself. However, if the object has been moved, the forwarding pointer points to the new object location. The eager read barrier maintains the registers and stack cells such that the registers and stack cells always point into to-space. Barrier-sinking and common sub-expression elimination are used to minimize the overhead associated with the read barrier.

11 Claims, 10 Drawing Sheets

U.S. PATENT DOCUMENTS

| | | | |
|---|---|---|---|
| 7,228,404 B1 * | 6/2007 | Patel et al. | 712/228 |
| 7,254,806 B1 * | 8/2007 | Yates et al. | 717/136 |
| 7,555,619 B2 * | 6/2009 | Harris | 711/162 |
| 7,590,806 B2 * | 9/2009 | Harris et al. | 711/154 |
| 7,725,885 B1 * | 5/2010 | Pradhan et al. | 717/148 |
| 7,747,565 B2 * | 6/2010 | Harris et al. | 707/609 |
| 7,792,880 B2 * | 9/2010 | Arnold et al. | 707/817 |
| 2002/0147969 A1 * | 10/2002 | Lethin et al. | 717/138 |
| 2003/0126352 A1 * | 7/2003 | Barrett | 711/100 |
| 2005/0004892 A1 * | 1/2005 | Brundage et al. | 707/3 |
| 2005/0149346 A1 * | 7/2005 | Arnold et al. | 705/1 |
| 2007/0050603 A1 * | 3/2007 | Vorbach et al. | 712/221 |
| 2007/0130238 A1 * | 6/2007 | Harris et al. | 707/206 |
| 2007/0136290 A1 * | 6/2007 | Shinnar et al. | 707/8 |
| 2007/0136365 A1 * | 6/2007 | Tarditi et al. | 707/103 R |
| 2007/0143276 A1 * | 6/2007 | Harris | 707/4 |
| 2007/0143360 A1 * | 6/2007 | Harris et al. | 707/202 |
| 2007/0143741 A1 * | 6/2007 | Harris | 717/121 |
| 2007/0169030 A1 * | 7/2007 | Tarditi et al. | 717/140 |
| 2007/0169031 A1 * | 7/2007 | Harris | 717/140 |

* cited by examiner

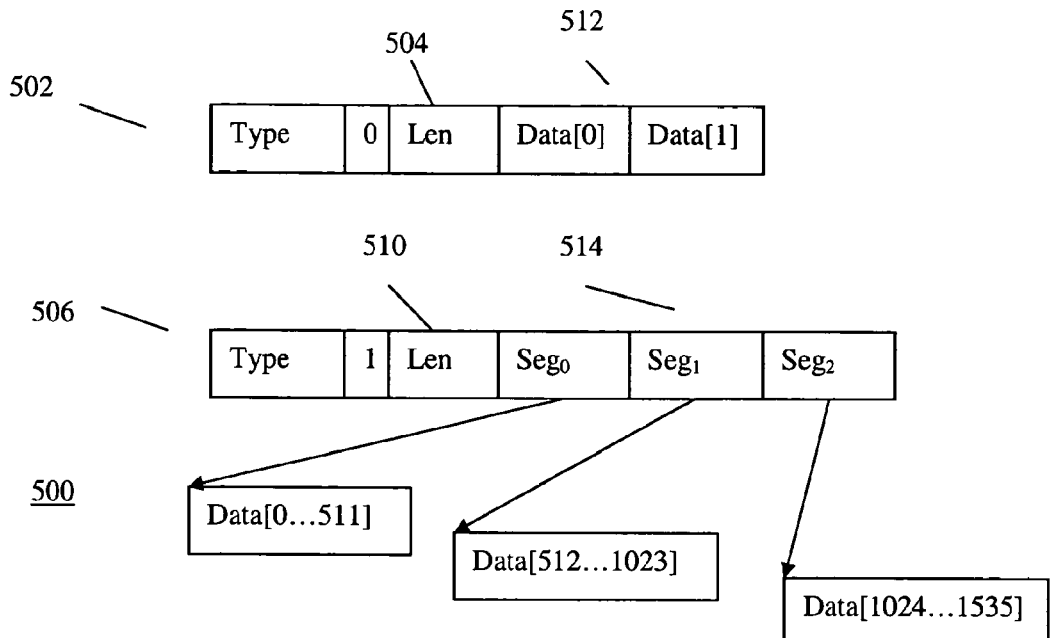
FIG. 5(a)  Non-uniform Array Layout
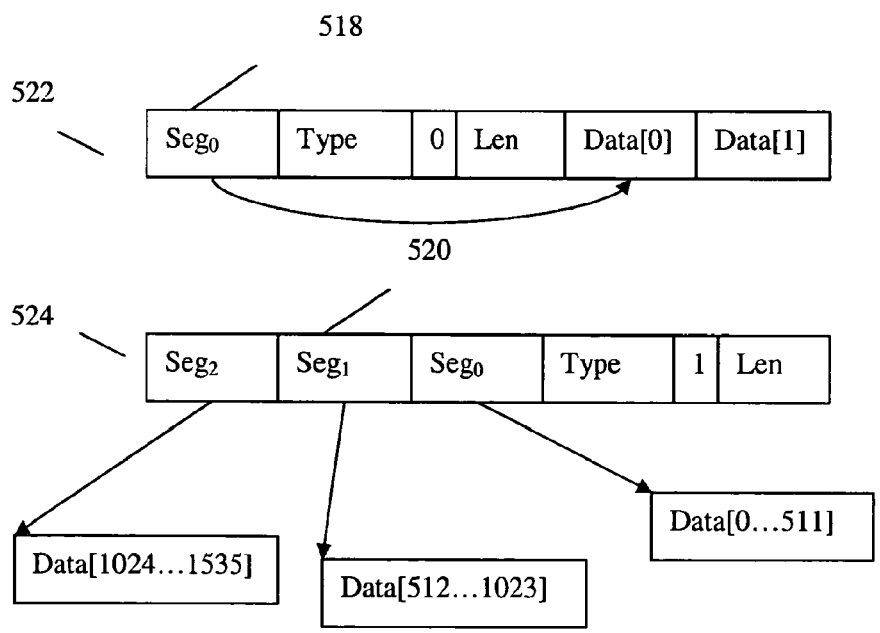
FIG. 5(b)  Uniform Array Layout

600

```
iload(array, index)
    lfield = array.length
    byteindex = index << 2
    length = BitClear(lfield, 31)
    trap if (index < 0 || index >= length)
    arraylet = (byteindex >> SHIFT) << 2
    array = array[arraylet]
    byteindex = byteindex & MASK
    return array [byteindex]
```

FIG. 6(a) Non-uniform Array Access

602

```
iload(array, index)
    lfield = array.length
    byteindex = index << 2
    length = BitClear(lfield, 31)
    trap if (index < 0 || index >= length)
    if (lfield < 0)
            arraylet = (byteindex >> SHIFT) << 2
            arraylet = -12 - arraylet
            array = array[arraylet]
            byteindex = byteindex & MASK
    return array [byteindex]
```

FIG. 6(b) Uniform Array Access

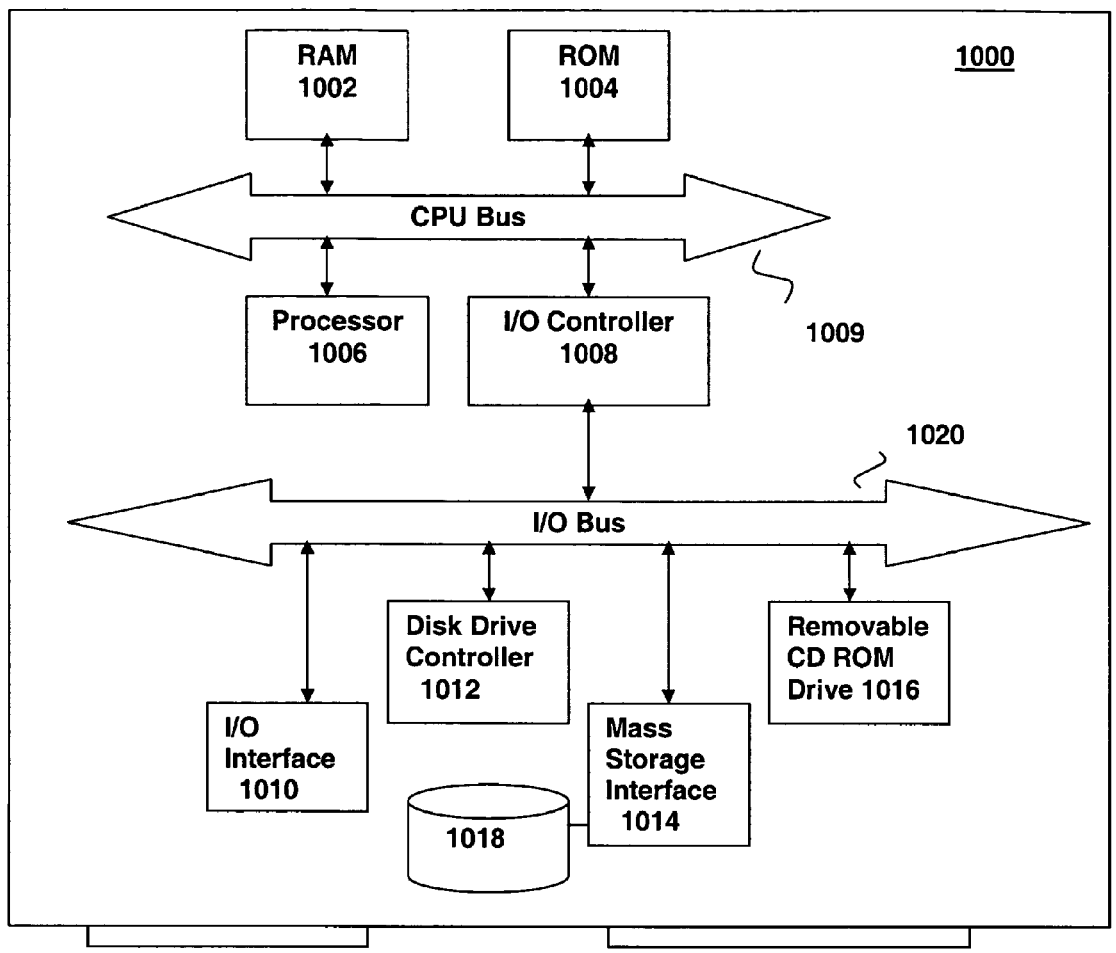
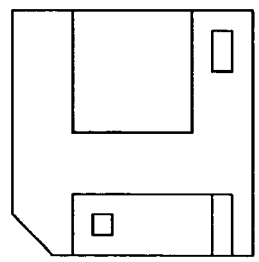
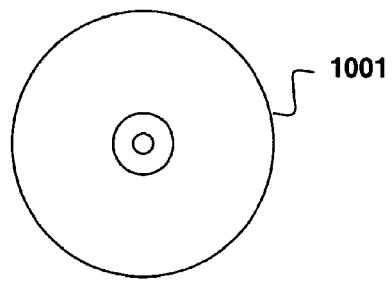
FIG. 10

GARBAGE COLLECTOR WITH EAGER READ BARRIER

CROSS-REFERENCE TO RELATED APPLICATIONS

This application is a continuation of, and claims priority from, commonly-owned and co-pending U.S. patent application Ser. No. 10/751,793, filed on Jan. 5, 2004, which application is incorporated by reference as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of computer memory management. More particularly, the present invention relates to the use of an eager read barrier with a garbage collection process for a real-time application.

BACKGROUND OF THE INVENTION

With regard to computers, garbage collection refers to a process of identifying unused areas of main memory storage. In accordance with an object oriented computing language, the computer executing the program allocates memory for each of the objects. Memory is allocated to, and freed from, the heap in blocks of one of a number of predetermined sizes. Eventually, when the objects are no longer being referenced by the program, the memory allocated for the created objects is reclaimed through a garbage collection process. The garbage collection process clears the objects from memory whereby the once allocated memory is again available for use. More particularly, a garbage collection process involves automatically determining which blocks of memory can be freed, marking partially used object as no longer needed by an application, collecting all of the partially used blocks of memory at periodic intervals, returning the partially used blocks to the heap and marking the blocks as free for use. Such a garbage collection process is often referred to as a mark-and-sweep since unused portions of memory are marked as garbage during a mark phase and then removed from allocated memory in a sweep phase. Although the process of garbage collection frees memory, it may be problematic in applications where its unpredictable consumption of processor time affects the running of the application.

Read barrier is a term of art that describes a special check performed each time application code fetches a value from a heap memory location. The read barrier serves to coordinate the application processing with the garbage collection. The read barrier checks each pointer reference to verify that the object accessed through the pointer has not moved. Unfortunately, high software and processing overhead costs are typically associated with prior art read barriers and they are often considered inappropriate for real-time systems. In addition, the implementation of the read barrier introduces time consuming required null-checks. Therefore, what is needed is an improved read barrier that can be optimized to reduce its associated overhead and used with a real-time application.

SUMMARY OF THE INVENTION

An application of the present invention is directed toward a method of implementing a garbage collection process for an application program. According to the method, a read barrier is used to access objects in the memory as part of the garbage collection process and to facilitate moving of the objects. The read barrier is made eager such that it performs a forwarding operation as soon as a quantity is defined. In addition, the eager read barrier maintains registers and stack cells such that the registers and stack cells always point into to-space. Thus, a forwarding operation for a quantity used in a loop is only performed once. The eager read barrier includes a forwarding pointer in a header of the objects. Barrier sinking is used to sink the eager read barrier to its point of use. The garbage collection process and the real-time application are interleaved on a time-based schedule.

Another application of the present invention is directed toward a method of minimizing overhead costs associated with the use of a read barrier utilized as part of a garbage collection process for a real-time application. According to the method, memory space is allocated for the application. The memory space is segmented into a number of pages of a predetermined size. Each page is divided into blocks of a predetermined size and the objects to be allocated are identified. The objects are then allocated into the pages and blocks. Objects are marked as no longer used and the dead objects are moved. The memory is defragmented by moving the objects. A forwarding operation required to access the objects is performed with a read barrier as soon as a quantity is loaded. The read barrier is an eager read barrier that uses a forwarding pointer. The read barrier maintains a to-space invariant. A forwarding operation for a quantity used in a loop is only performed once. Barrier sinking is used to sink the read barrier to its point of use. The read barrier maintains registers and stack cells such that the registers and stack cells at every yield point into to-space.

Yet another application of the present invention is directed toward a software package for performing a real time application. The software package includes application software for performing the real time application. Garbage collection software for performing a garbage collection process is also included. An eager software read barrier performs a forwarding operation required by the process as soon as a quantity is loaded. A forwarding pointer is located in a header of objects accessed by the eager read barrier garbage collector. The software includes barrier sinking optimization software for sinking the eager read barrier to its point of use. The eager read barrier maintains registers and stack cells such that the registers and stack cells always point into to-space. The garbage collection process and the real-time application are interleaved on a time-based or work-based schedule.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIGS. 5(a) and 5(b) are illustrations of non-uniform and uniform array layouts for both segmented and unsegmented arrays in accordance with embodiments of the present invention.

FIGS. 6(a) and (b) depict pseudo-code for implementing non-uniform and uniform array access in accordance with embodiments of the present invention.

FIG. 10 is a diagram of the physical components needed to implement an embodiment of the present invention.

DETAILED DESCRIPTION

A collector constructed in accordance with a preferred embodiment of the present invention will provide guaranteed performance provided that the application is correctly characterized by the user. In particular, the user must be able to specify the maximum amount of simultaneous live data, m, as well as the peak allocation rate over the time interval of a garbage collection $\alpha*(\Delta GC)$. The collector is characterized by its tracing rate R. Given these characteristics of the mutator and the collector, the user has the ability to tune the performance of the system using three interrelated parameters: total memory consumption, minimum guaranteed CPU utilization and the resolution at which the utilization is calculated.

Figure 1:
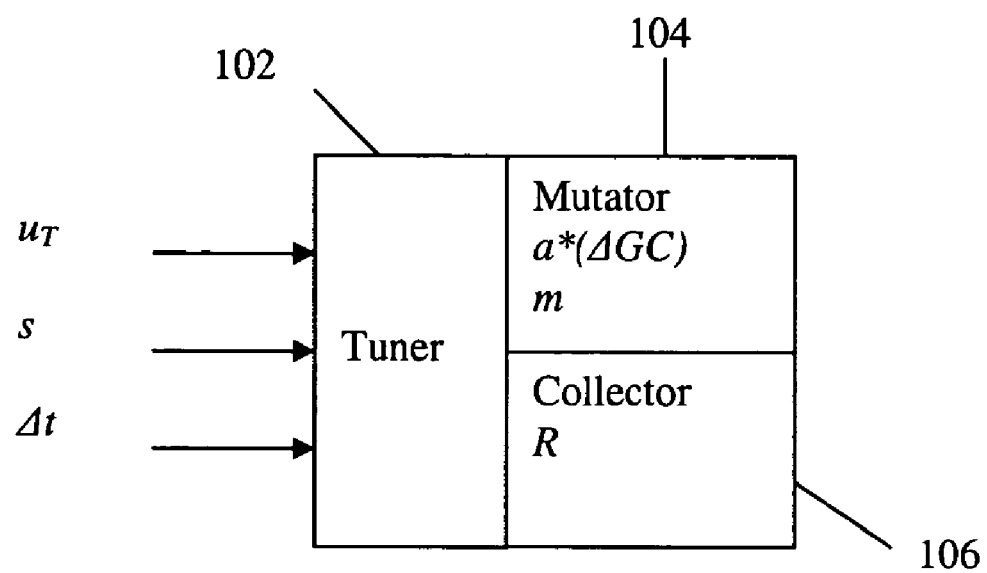
FIG. 1 is a diagram of the system parameters that can be used to tune the performance of an object oriented application in accordance with an embodiment of the present invention.

The relationship between these parameters is shown graphically in FIG. 1. The mutator 104 is characterized by its allocation rate over a garbage collection interval $\alpha*(\Delta GC)$ and by its maximum memory requirement m. The collector 106 is characterized by its collection rate R. The tunable parameters 102 are $\Delta t$, the frequency at which the collector is scheduled, and either the CPU utilization level of the application $u_T$ (in which case a memory size s is determined) or a memory size s which determines the utilization level $u_T$. By setting these parameters to limit CPU utilization and memory size, and using defragmentation techniques, a garbage collection routine can be implemented in a real-time application such as an automotive control system that has strict availability requirements.

Figure 2:
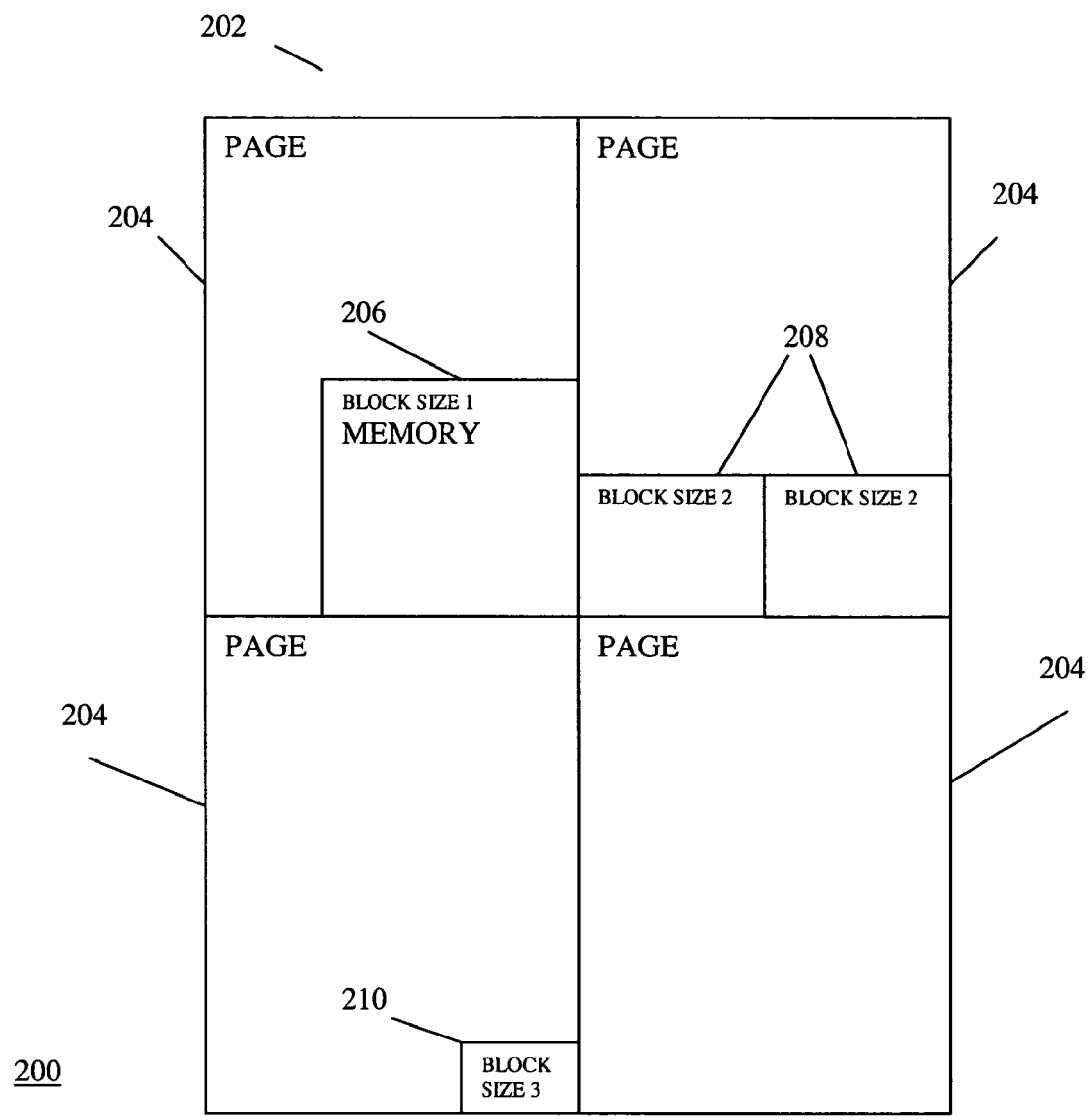
FIG. 2 is a diagram of a method of dividing a memory into pages and block class sizes in accordance with an embodiment of the present invention.

Referring now to FIG. 2, a diagram 200 of a scheme 200 for dividing a memory 202 according to a preferred embodiment of the present invention is shown. The memory 202 is divided into a series of pages 204 each of a size $\Pi$. Each page 204 is divided into a number of fixed size blocks 206, 208 and 210 with a maximum block size 206 of $\Sigma$. In a preferred embodiment, the page size, $\Pi$, and the maximum block size, $\Sigma$, are both powers of two. While the maximum block size is $\Sigma$, a number, n, of smaller classes of block sizes are also created. Memory is allocated for objects from blocks of the smallest size class that will accommodate the object. Using a large number of block size classes with a relatively low ratio of adjacent class sizes reduces the amount of fragmentation as discussed in more detail below.

The total fragmentation of a system such as that shown in FIG. 2 can be categorized as one of three types. First, there is unused space at the end of each block which is referred to as internal fragmentation. Internal fragmentation is fundamentally expressed as a ratio between the inherent space required by live objects and the actual amount of space they consume. A ratio $\rho$ between the adjacent block sizes shown in FIG. 2 can be used to bound the amount of internal fragmentation. In particular, a preferred embodiment of the present invention uses a small ratio between adjacent block size classes because, even if fragmentation occurs, the blocks will be compacted and unused pages can be redistributed to other sizes. Thus, the internal fragmentation is limited to p by selecting the block size classes such that adjacent size classes $c_i$ and $c_{(i-1)}$ satisfy the formula $c_i = c_{(i-1)(1+\rho)}$. The collector is, thus, adaptive in that it responds to the changing object size needs of an application. However, it will be appreciated that when the system is operating in the steady state, the distribution of object sizes is relatively constant and little defragmentation may actually be required.

Secondly, there is unused space at the end of a page which is referred to as page-internal fragmentation. The ratio of the page size to the largest block class size primarily determines the amount of page-internal fragmentation. More particularly, the amount of internal fragmentation is generally bound by the largest block size divided by the page size. Thus, the selection of the page size and the largest block size class may be used to bound the page-internal fragmentation for time or memory sensitive applications.

Finally, there are partially used object in partially used pages that could satisfy a request for a different size object. This type of fragmentation is referred to as external fragmentation. External fragmentation only occurs on pages that have both live and dead objects. External fragmentation is often determined by the size of the objects being allocated by the application. Applications typically exhibit locality in that the number of objects of a particular size class that were allocated during a previous cycle is often a good predictor of the number of objects in the size class that will be allocated during the next cycle. External fragmentation is practically eliminated in accordance with an embodiment of the present invention by using arraylets or blocks whereby large arrays are broken into fixed-sized pieces. This bounds the potential external fragmentation caused by large objects. In addition, explicit defragmentation may be performed on pages containing dead objects as discussed in more detail herein.

A most preferred embodiment of the present invention uses a Brooks-style read barrier wherein each object contains a forwarding pointer that normally points to itself. However, when the object has been moved, the pointer points to the moved object. The memory is divided into a current area referred to as the from-space that is used by the processors during current program execution and a reserved area referred to as the to-space. Because the preferred embodiment uses a forwarding pointer, the collector maintains a to-space invariant. Thus, the mutator or application always sees the new version of an object. However, the sets comprising the from-space and to-space have a large intersection, rather than being completely disjoint as in a pure copying collector. While the preferred embodiment uses a read barrier and a to-space invariant, the collector does not suffer from variations in mutator utilization because all of the work of finding and moving objects is performed by the collector during the collection phase. Traditionally, in a copying collector the to-space and the from-space are physically disjoint. According to this embodiment, the to-space and the from-space are logical and hence there may be a physical overlap.

The read barrier can be either lazy or eager. A lazy barrier has the property that registers and stacks cells can point to either from-space or to-space objects and the forwarding operation is performed at the time of use or execution. Conversely, an eager barrier maintains the invariant such that registers and stack cells always point into to-space. Thus, the forwarding operation is performed eagerly as soon as the quantity is loaded or defined. Eager barriers have a major performance advantage in that if a quantity is loaded and then dereferenced many times, such as when a reference to an array of integers is loaded and then used in a loop, the eager barrier will only perform the forwarding operation once when the array is defined. A lazy barrier will perform the forwarding operation for every array access. The cost to using an eager barrier is that, because the eager barrier is stricter, it is more complex to maintain. Whenever the collector moves objects, it must find all outstanding register and stack cells and re-execute the forwarding operation on them.

Figure 3:
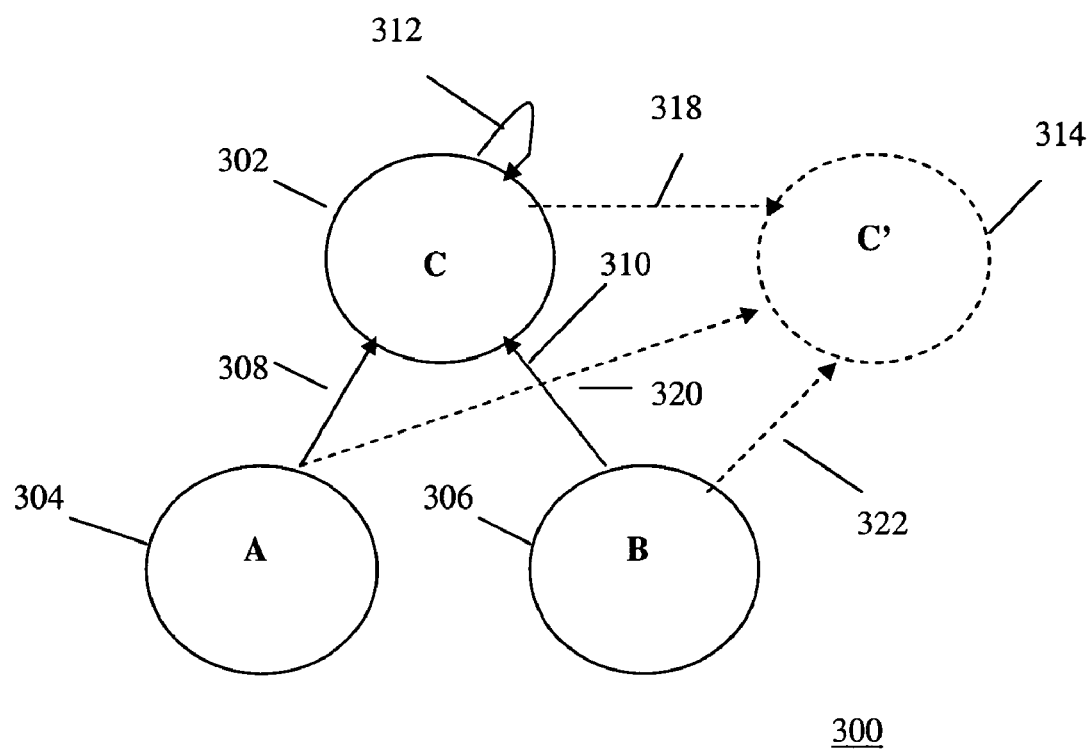
FIG. 3, is an illustration of a method of moving objects using a read barrier with a forwarding pointer in accordance with an embodiment of the present invention.

A preferred method 300 of moving of an object using a read barrier with a forwarding pointer in accordance with an embodiment of the present invention is described with respect to FIG. 3. The object to be moved C 302 is referenced by two applications A 304 and B 306 which have their respective pointers 308 and 310 pointing toward C 302. The forwarding pointer 312 in C 302 originally points to C 302 itself. To move the object C 302, a new block of memory C' 314 is first allocated for the object C 302. Once a new block of memory has been allocated, the content of C 302 is then moved into C' 314. The forwarding pointer 312 of object C 302 is then pointed 318 toward C' 314. Thus, if an application calls on object C 302, the forwarding pointer 318 redirects the application to C' 314. Finally, the pointers 308 and 310 from applications A 304 and B 306 are redirected, as shown by arrows 320 and 322 respectively, toward the new memory location for the object C' 314. Thus, the collector maintains a to-space invariant such that the mutator or application always sees the new version C' of the object C. Once the pointers 308 and 310 have been updated to pointers 320 and 322 to point to C' 314, the object C 302 is no longer referenced by an application. Thus, the object C 302 will be marked as unused or dead during the mark phase such that the memory blocks will be freed for future use as discussed in more detail below.

Figure 4:
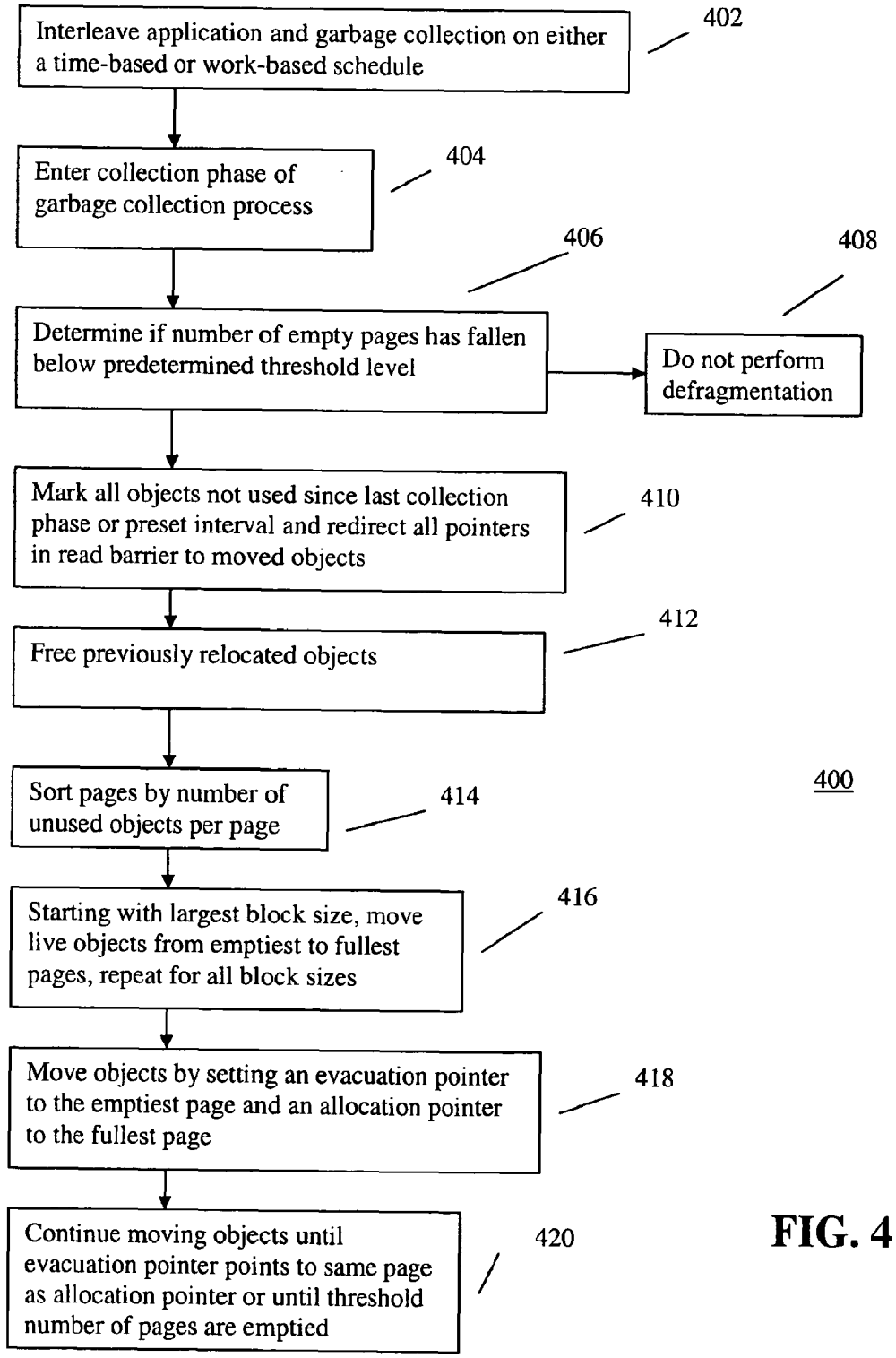
FIG. 4 is a flow chart for implementing a defragmentation process during a garage collection phase in accordance with an embodiment of the present invention.

Referring now to FIG. 4 a preferred method 400 for accomplishing defragmentation during the collection phase of a garbage collection process is shown. In step 402, the application and garbage collection are interleaved on either a time-based or work-based schedule. Work-based algorithms may achieve short individual pause times but are typically unable to achieve consistent utilization. A work-based algorithm does a little garbage collection each time the mutator allocates memory. By keeping this interruption short, the work of collection is spread evenly throughout the application. Unfortunately, programs are not uniform in their allocation behavior over short time scales, rather they are bursty. As a result, work-based strategies suffer from very poor mutator utilization during such bursts of allocation. Time-based scheduling interleaves the collector and the mutator on a fixed schedule. These systems are quite stable and only require a small number of coarse parameters that describe the application's memory characteristics to function within well controlled space bounds.

Defragmentation occurs during the garbage collection phase as set forth in step 404. First, it is determined whether or not the number of empty pages of memory has fallen below a threshold number of empty pages of memory as shown in step 406. If the threshold has not been breached, the proceeds to step 408 wherein no defragmentation occurs during the present garbage collection phase. The threshold number of pages is selected such that there is always enough memory to run the primary real time application. If the threshold has been breached, the method proceeds to step 410 wherein all objects that have not be used since the last collection cycle are marked as dead objects. During the mark phase of the garbage collection process, the memory blocks for all of the objects that have been previously relocated during a previous collection process are freed or released for future use as shown in step 412.

Once the objects have been marked as live or dead, the pages of memory are sorted according to the number of dead objects per page as shown in step 414. In one embodiment, the first entry in the list contains the page with the least number of dead objects and the last entry contains the page with the greatest number of dead objects. In step 416, starting with the largest block size, live objects are moved from the pages having the most dead objects to pages having the least dead objects. After the largest block class sized objects have been moved, the process is repeated for each lower block size. The later smaller classes of blocks are used to fill in the holes left by the allocation of the larger earlier blocks. Thus, proceeding in this manner reduces the internal fragmentation of the heap. The objects are preferably moved by setting an evacuation pointer to the emptiest page and an allocation pointer to the fullest page in step 418. The process continues in step 420 until the evacuation pointer and the allocation pointer point to the same page or, alternatively, until the threshold number of pages has been emptied. The process then waits until the threshold is again violated at which time the garbage collection cycle begins again.

Large objects pose special problems for garbage collectors. In copying collectors, if there are repeatedly copied, the performance penalty can be very high. In non-copying collectors, external fragmentation can make it impossible to allocate a large object. For example, a single small object in the middle of the heap can make it impossible to satisfy a request for an object slightly larger than half the heap. Furthermore, in incremental and real-time collectors, large objects pose an additional problem because they cannot be moved in a reasonably bounded amount of time.

In accordance with a preferred embodiment of the present invention, a mostly non-copying collector is used to implement a novel approach. Short arrays of a predetermined length are represented as contiguous structures while long arrays are represented as two-level arrays comprised of arraylets of size $\Sigma$ where $\Sigma$ is a power of two. Thus, the preferred embodiment has the advantage of never needing to allocate large object contiguously and, therefore is not subject to prohibitive external fragmentation. Nevertheless, access to the array elements is still efficient and is as efficient as using a contiguous layout when used in conjunction with strip-mining optimizations. The arraylet size, $\Sigma$, is chosen in accordance with desired performance given a tradeoff. If the arraylet size is set sufficiently large, all non-array objects will be contiguous and the implementation is simplified. However, if the arraylet size is too large, the potential that a large object cannot be allocated from the heap is increased. In addition, the time bounds may not be acceptable for a real-time application.

Two different schemes can be used to implement the arraylets, a non-uniform array representation and a uniform array representation. Referring now to FIG. 5(a), a non-uniform system 500 for representing arraylets is shown. The representations for contiguous arrays 502 shorter than .SIGMA. are unchanged. The high bit of the length field 504 is set to zero for such a short array 502. Segmented arrays 506 are represented by setting the high bit of the length field 510 to one. In addition, the array data 512 is replaced with a list of arraylet pointers 514. The final arraylet can be of any size to prevent fragmentation due to fixed-size arraylets.

The non-uniform method works well but may be problematic when used with optimizations. In particular, since the representation is non-uniform, unless the compiler can prove that an array is contiguous, it must generate code for both bases at each array access. This tends to yield a pattern of successive diamonds in the control-flow graph. Thus, in order to achieve good performance, control-flow graph splitting needs to be performed to eliminate multiple tests and allow common sub-expression elimination. However, control-flow graph splitting is problematic for the non-uniform representation scheme because, if there are n arrays in a loop, it may require $2^n$ versions of the loop to handle all of the difference combinations of contiguous and segmented arrays.

Due to the above discussed deficiencies in the non-uniform representation scheme, preferred embodiments of the present invention use an arraylet representation that is fully uniform 516 as shown in FIG. 5(b). The arraylet pointers 518 and 520 are now conceptually part of the header and exist for all arrays whether the arrays are contiguous 522 or segmented 524. When the array is contiguous 522, the arraylet pointer 518 simply points back to the beginning of the data area. When the array is non-contiguous 524, the arraylet pointers 520 point to the arraylets.

Assembler pseudo-code for non-uniform arraylet access 600 is set forth in FIG. 6(a) and assembler pseudo-code for uniform arraylet access 602 is set forth in FIG. 6(b). Like the code for the non-uniform arrays 600, the uniform code 602 tests whether the array is contiguous and if so uses a fast path for array access. When performing arraylet access, the uniform code 602 is slightly slower because it must perform negative indexing and jump past the object header. However, the major advantage of the uniform representation is that the conditional can always be dropped. Initially this leads to lower performance as contiguous array access is more expensive. However, it creates a structure that that is much easier for the optimizer to work with. There is only a single path in the control-flow graph, and since the arraylet calculations are not control-dependent, they can be merged by common sub-expression elimination. With the addition of strip-mining, it is possible to move arraylet base calculations entirely out of most inner loops.

The arraylet scheme can also use opportunistic contiguous allocation whereby it first attempts to allocate all arrays contiguously and only divides an array into arraylets if this cannot be accomplished. Allocation can also only be performed when an allocation would cause a segmented array table to grow. When performing defragmentation, discontiguous arrays can be made contiguous if possible to remove entries from the segmented array table. Also, if a large array needs to be moved, it can be moved at the beginning of a collection quantum so that it can finish moving before the end of the quantum. In such a case, it would appear to the mutator that the array was never segmented. If desired, code patching and thin guards can also be used to improve the systems performance.

Figure 7:
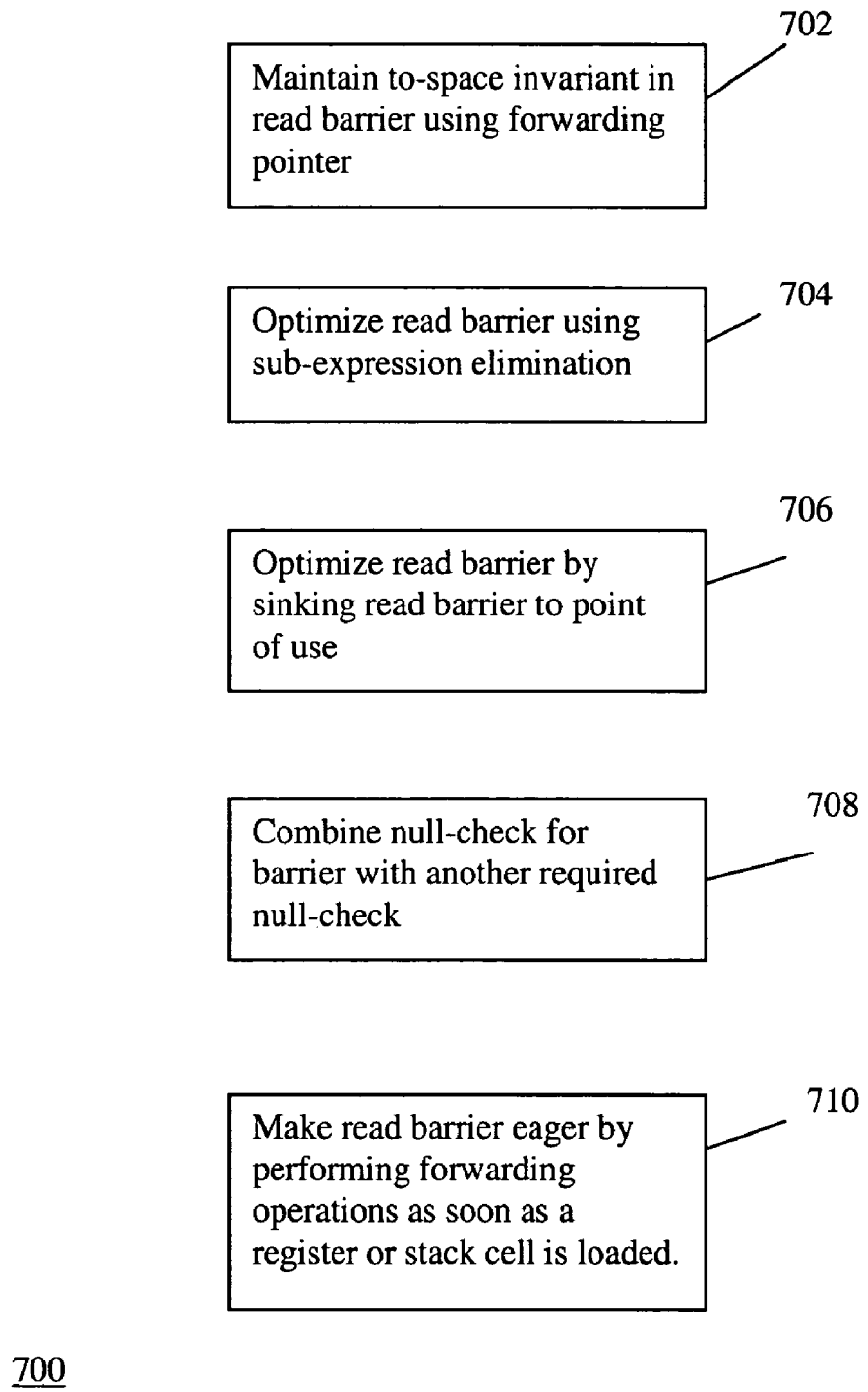
FIG. 7 is a list of a variety of techniques for minimizing problems that occurred with prior art read barriers in accordance with preferred embodiments of the present invention.

The read barrier of the present invention uses a variety of techniques 700 to minimize the problems that occurred with prior art read barriers as set forth in FIG. 7. For example, the read barrier maintains a to-space invariant in the read barrier using forwarding pointer as shown in step 702. However, the read barrier does not suffer from variations in mutator utilization because all of the work of finding and moving objects is performed by the collector. The preferred embodiment also overcomes the high software costs typically associated with a read barrier by implementing the read barrier in an optimizing compiler wherein the compiler is able to optimize the barrier. The compiler may be a just-in-time compiler such as often used in connection with Java programs. A number of optimizations can be used to reduce the costs of the read barriers. Common sub-expression elimination 704, as well as other special purpose optimizations like barrier-sinking 706 in which the barrier is sunk down to its point of use are used. Sinking the read barrier to its point of use allows the read barrier to be optimized as part of the compilation process. The use of optimizations also allows the null-check required by the Java object dereference to be folded into the null-check required by the barrier 708. Since the pointer can be null, the barrier can not perform forwarding unconditionally. Optimization works with whatever null-checking approach is used by the run time system whether it is accomplished via explicit comparisons or implicit traps on null dereferences. The point is to usually avoid introducing explicit checks for null and the preferred embodiment guarantees that any exception due to a null pointer occurs at the same place as it would have in the original program. In addition, the read barrier is preferably an eager read barrier that performs forwarding operations as soon as a register or stack cell is loaded 710. As stated above, eager barriers have major performance advantages for real time applications. A straight forward implementation of the preferred read barrier requires a compare, a branch and a load. However, in most cases, the compare and the branch can be optimized away and common sub-expression elimination can be performed on the remaining loads.

In certain cases, it is infeasible to introduce a read barrier. In such cases, the read barrier can be omitted as long as the object is pinned to guarantee that it never moves. Fortunately, most objects that fall into this category are run-time data structures that are immortal. By maintaining a separate immortal heap, these objects never have any fragmentation and thus do not need to be moved.

Preferred embodiments of the present invention are particularly well suited for use with applications that require real-time scheduling. The combined real-time behavior of the user program and the garbage collector is defined using the instantaneous memory allocation rate at time $\tau$, $A^*(\tau)$, and the instantaneous garbage generation rate at time .tau., $G^*(\tau)$. A unit for these quantities would be megabytes per second or MB/s. The amount of memory allocated and garbage generated over an interval is obtained by integrating $A^*(\tau)$ and $G^*(\tau)$ over the interval. P is used to define the garbage collector processing rate. Since the preferred collector is a tracing collector, P is measured over live data. The time $\tau$ is on an idealized axis in which the collector runs infinitely fast called mutator time. As a practical matter, this can be thought of as time measured when the program has sufficient memory to run without garbage collecting. The only other primitive parameters required to describe the real-time system are the relative rates of the mutator and the collector. These parameters are used to calculate a maximum memory allocation rate and maximum garbage generation rate. The instant memory requirement of the program excluding garbage, overhead and fragmentation is equal to the maximum memory allocation rate and the maximum garbage generation rate.

Because the collector is not infinitely fast, execution will consist of alternate executions of mutator and collector. For exemplary purposes, time along the real time axis may be denoted by the variable t. The function $.\phi.(t).\rightarrow\tau$ then maps from real time t to mutator time $\tau$. Functions that operate in mutator time are written $f^*(\tau)$ while functions that operate in mutator time are written $f(t)$. The live memory of the program at time t can thus be defined as $m(t)=m^*(\phi(t))$. The maximum memory requirement over the program's entire execution is simply the maximum value m of m(t).

As previously discussed, time-based scheduling interleaves the collector and mutator using fixed time quanta. Thus, time-based scheduling results in even CPU utilization but is subject to variations in memory requirements if the memory allocation rate is uneven. A time-based real-time collector has two additional parameters; $Q_T$, the mutator quantum or the amount of time the mutator is allowed to run before the collector is allowed to allocate; and, $C_T$, the time-based collector quantum or the amount of time the collector is allowed to run. If the scheduler is perfect and the number of time intervals is large, the minimum mutator utilization, $u_T$, may be expressed as $Q_T/(Q_T+C_T)$. However, it is important to note that in real-time systems the variations that occur over small intervals are very significant. In practice, at large time intervals $u_T$ is only a lower bound on the utilization, since in most cases the collector only runs intermittently.

In a real-time system, the space utilization of a time-scheduled collector is also important. If the collection rate is constant, at time t, the collector will run for m(t)/P seconds to process m(t) live data. Since the preferred collector is trace-based, work is essentially proportional to live data and not garbage. For a given period of time, the mutator will work for $Q_T$ seconds per $C_T$ seconds executed by the collector. Therefore, we can define the excess space required in order to run a collection at time, t, as $e_T(t)=\alpha^*(\phi(t), \phi(t)+(m(t)/P)(Q_T/C_T))$. The maximum excess space required is simply the maximum value of e(t) over a period a time.

Freeing an object with a collector may require as many as three collections. The first is to collect the object. The second arises from the fact that an object may have become garbage immediately after a collection began and, therefore, will not be discovered until the following collection cycle. The third arises from the fact that an object may need to be relocated so that the system can make use of its space. The first two properties are universal for all incremental garbage collection systems.

Given the above discussed parameters, the space requirements for a preferred collector paired with a given application including un-reclaimed garbage, but not including internal fragmentation, at time t can be expressed as $s_T(t) \leq m(t)+3e_T$. The maximum overall space requirement can be expressed as $S_T \leq m+3e_T$ using the above discussed parameters. However, the expected space utilization is only $m+e_T$ and the worst-case utilization is highly likely.

Work-based scheduling interleaves the collector with the mutator based on fixed amounts of allocation and collection. A work-based, real-time collector is parameterized by the work-based mutator quantum, $Q_W$, which is the number of bytes the mutator is allowed to allocate before the collector is allowed to run. The work-based collector is also parameterized by the work-based collector quantum, $C_W$, which is the number of bytes that the collector must process each time the mutator yields to it. The excess space required to perform a collection at time, t, is $e_W(t)=m(t)(Q_W/C_W)$. The excess space required for a collection over the entire execution is $e_W=m(Q_W/C_W)$. From this equation, it is apparent $Q_W$ must be less than $C_W$ or else the space might grow without bound. Thus, the space requirement of the program at time t is $s_W(t) \leq m(t)+3e_W$ and the space requirement for the entire program execution is $s_W=m+3e_W$.

Computing mutator CPU utilization when collector scheduling is work-based is inherently problematic because the operation of the mutator may affect the amount of time allocated to the mutator. The time dilation is linear and fixed in time-based scheduling but variable, non-linear and application-dependent in work-based scheduling. Due to these problems, it is not possible to obtain a closed-form solution for the utilization. However, each mutator pause involves the collector processing $C_W$ memory at rate P. Hence, each mutator pause will be of duration d where $d=C_W/P$. Each mutator quantum will involve application of $Q_W$ memory. Thus, the minimum total mutator time $\Delta\tau_i$ for i quanta will be given by the minimum $\Delta\tau_i$ that satisfies the equation $\alpha^*(\Delta\tau_i)=iQ_W$. As the time interval increases, the maximum allocation in that time does not decrease, so $\alpha^*(\Delta\tau_i)$ is a monotonically increasing function and hence $\Delta\tau_i > \Delta\tau_{i-1}$. Therefore, the solution to the equation $\alpha^*(\Delta\tau_i)=iQ_W$ can be found with an iterative method. This is analogous to the iterative solution to rate monotonic scheduling in real-time systems. In a work-based collector, utilization will be zero for any interval of time less than the mutator pause. In fact, any large allocation of $nQ_W$ bytes will lead to zero utilization for time nd. Thus, in a work-based collector, there is a much larger burden on the programmer to achieve real-time bounds by making sure that memory allocation is sufficiently discretized and evenly spaced.

In addition to allocation, the other kind of work by the mutator that can interact with the operation of the collector is the actual heap mutation. Mutation is an alternate way for roots to be added long with stack scanning. Work is preferably divided between the mutator and the collector such that the mutator's write barrier is responsible for making sure that only non-null, unmarked objects are placed into the write buffer. This ensures that the work performed by the collector attributable to mutation is O(N) where N is the number of objects while the overhead of the write barrier is kept constant. The collector periodically processes the write buffer and treats the entries like any other potential roots. The objects are marked and placed in the work queue for scanning. In the worst case, the work queue can reach size N. Since mutation consumes memory just like allocation by the mutator, mutation should be taken into account when determining collector performance. This is accomplished by simply defining allocated memory to include both directly allocated memory and indirectly allocated memory due to mutation wherein each mutation consumes memory the size of one object pointer. However, if desired, the formulas discussed herein could be revised to express each kind of space consumption individually.

The degree to which each collector will be able to meet its predicted behavior will depend quite strongly on the accuracy of the parameters which are used to describe the application and the collector strategy. The needed parameters are $A^*(t)$ and $G^*(t)$ for the application, P for the collector and, either $Q_T$ and $C_T$ or $Q_W$ and $C_W$ depending upon whether the collector is time-based or work-based. In practice, the user describes the application in terms of its maximum memory consumption m and its maximum allocation rate $\alpha^*(\Delta\tau_i)$.

The CPU utilization rate $u_T$ of the time-based collector is strictly dependent on the quantization parameters $Q_T$ and $C_T$. Thus, the utilization is very steady depending only upon implementation induced jitter and subject to the minimum quantization that the implementation can support. On the other hand, the space required to perform a collection, which determines the total space required to run the application, is dependent on both the maximum memory usage by the application m and the amount of memory allocated over an interval $\alpha^*$. Thus, if the user underestimates either m or $\alpha^*$, the total space requirement may grow arbitrarily. In particular, time-based collectors are subject to such behavior when there are intervals of time in which the allocation rate is very high. Furthermore, the estimate of the collector processing rate P should be a lower bound on the actual rate. Since the space consumed by the application is over a relatively long interval of time, i.e., the amount of time the application runs while a single collection takes place, the allocation rate will typically be close to the average allocation rate of the program and the variation will tend to be low. Therefore, to a first order, a time-scheduled collector will meet both its time and space bounds as long as the user estimate of m is correct.

In the work-based collector, the space overhead for a collection is straightforward to compute and it will be accurate as long as the user estimate of the total live memory m is accurate. On the other hand, the CPU utilization rate for a given interval depends on the allocation rate $\alpha^*(\Delta\tau_i)$ as well as the collector processing rate P. Since the interval over which real-time performance is required is small, the peak allocation rate for this interval is likely to be quite high. Thus, the CPU utilization of the work-based collector will vary considerably with the allocation rate. In particular, it should be noted that the interval in which the time-based collector is dependent on allocation rate is on the same scale as the amount of time required for a garbage collection. Therefore, to a first order, a work-scheduled collector will meet its space bound as long as a user estimate of m is correct. However, its CPU utilization will be heavily dependent on the allocation rate over a real-time interval.

A robust real-time collector should primarily use a time-based scheduling policy. However, if memory resources become scarce due to the fact that the input parameters to the collector may have been incorrect, the collector can slow down the allocation rate. This can be done in a number of ways. One approach in a real-time system is to separate the threads into priority classes. If the system becomes unable to meet its real-time bounds, low-priority threads may be successively suspended. Another approach is to begin using a hybrid strategy which becomes progressively more work-based as the collector comes closer to its memory limit. This approach will not guarantee that real-time bounds are met. However, it is robust even if the allocation rate and memory utilization of the top-priority threads have been underestimated.

Since purely non-copying algorithms are subject to high and often unbounded fragmentation, they are typically not suitable for real-time systems. Incremental semi-space copying collectors have an inherent space over head of 2(m+e)+f+g, where m is the maximum live heap memory, e is the space required to allow allocation to proceed during a single garbage collection, f is the maximum stack depth, and g is the maximum size of the global variable area. The preferred collector has an expected-case space requirement of m+e+f+g and a worst-case cost of m+3e+f+g+N, where N is the maximum number of uncollected objects. The extra 2e+N of space is incurred when a data structure of a size close to m is freed immediately after the beginning of a collection. Thus, the collector must run again to find it. This requires e extra space. In addition, all garbage found causes external fragmentation and requires an extra collection cycle to relocate the data and make it available. This requires another e of extra space. Furthermore, the program traverses the heap in a piecemeal fashion which forces a maximum number of pointers to be pushed onto the work queue for each mark operation and requires N extra words of memory.

There are two things to note about the worst-case memory requirements of the preferred collector. First, the difference between the worst-case for the preferred collector and a copying collector is e+N versus m. The space required to run a collection e is typically lower than the maximum live memory m and can be tuned. The maximum number of uncollected objects is the maximum uncollected space divided by the average object size in words A, or (m+e)/A. Since A is typically on the order of 8 for Java programs, N is typically small relative to m. Thus, for most programs, the worst-case performance of the preferred collector is smaller than that of a copying semi-space collector. Second, the likelihood of more than one of the worst case scenarios occurring concurrently is very low. In practice, this means that the amount of memory devoted to the system can be varied between the expected and worst-case space requirements depending on the acceptable failure rates for the system in question.

In accordance with the worst-case analysis of the collector, the program can be run in space m+3e where m is the amount of maximum live data and e is the space required to run a single collection. However, executing within these boundary conditions will result in the collector always running. Even if the application utilization is 50% during a collection, this will lead to an overall slowdown of the program by a factor of two which may be unacceptable. The solution is to provide headroom so that the program can run for sometime before a collection must occur. For example, if enough headroom is provided so that the collector only runs 25% of the time, then the overall utilization rises to 87.5%. Preferably, the headroom is set to be e. A collection is thus triggered when the amount of memory in use is m+e.

Ideally, a precise timer is used to control the scheduling of the mutator and collector processes. However, if a precise timer is not available, an approximate method based on polling may be used. In such a system, the mutator polls the timer on the slow path of allocation when it moves to a new page or when the mutation buffer fills up. This keeps the polling out of the fast in-lined cases but is subject to some inaccuracy. However, as a practical matter, this is acceptable because the increase of mutator utilization is occurring at times when resource consumption is low. On the other hand, the collector performs work in progressively finer work quanta as it gets closer to the end of its time quantum. When the time is close to or exceeds the quantum, the mutator is resumed.

Figure 8:
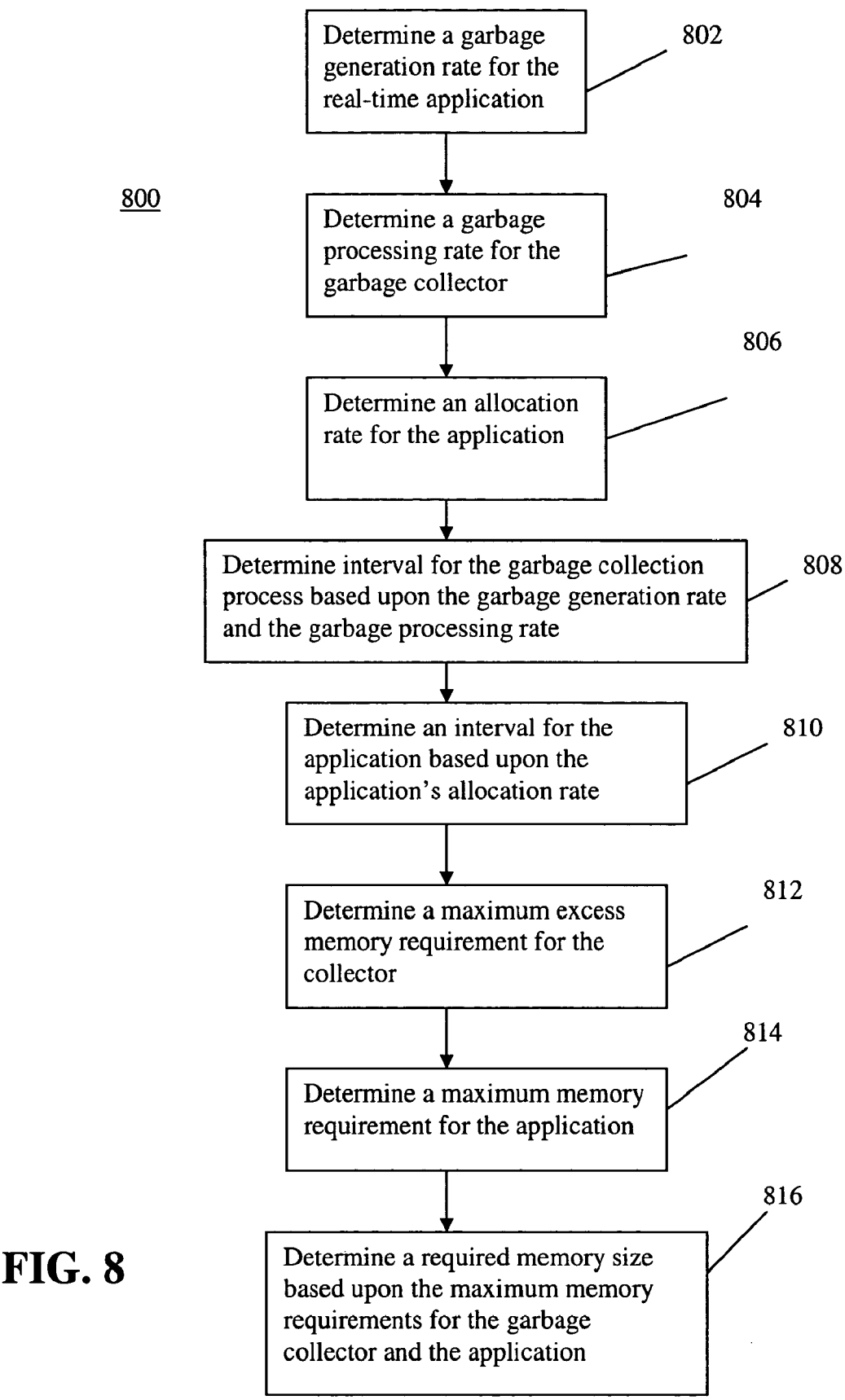
FIG. 8 is a flow chart of a preferred method for determining an appropriate time interval and amount of memory in accordance with the present invention.

A preferred method of scheduling a garbage collection in a real-time system is set forth in FIG. 8. The method commences in step 802 by determining a garbage generation rate for the real-time application. In addition, a garbage processing rate for the garbage collector is determined in step 804. The garbage generation and processing rates are used to describe the time-based performance of the garbage collector. An allocation rate for the application is determined in step 806. The allocation rate for the application is used to describe the time-based performance of the application. In step 808, an interval for the garbage collection process is determined based upon the garbage generation rate and the garbage processing rate. In a similar fashion, in step 810, an interval for the application is determined based upon the application's allocation rate. In order to select an appropriately sized memory, a maximum excess memory requirement for the collector is determined in step 812 and a maximum memory requirement for the application is determined in step 814. The memory requirements for the garbage collector and the application are then used to select a required memory size in step 816. Thus, the method shown in FIG. 8 allows a user to select an interleaving interval and a memory capacity for a system that will insure the application can satisfy its real-time requirements.

Figure 9:
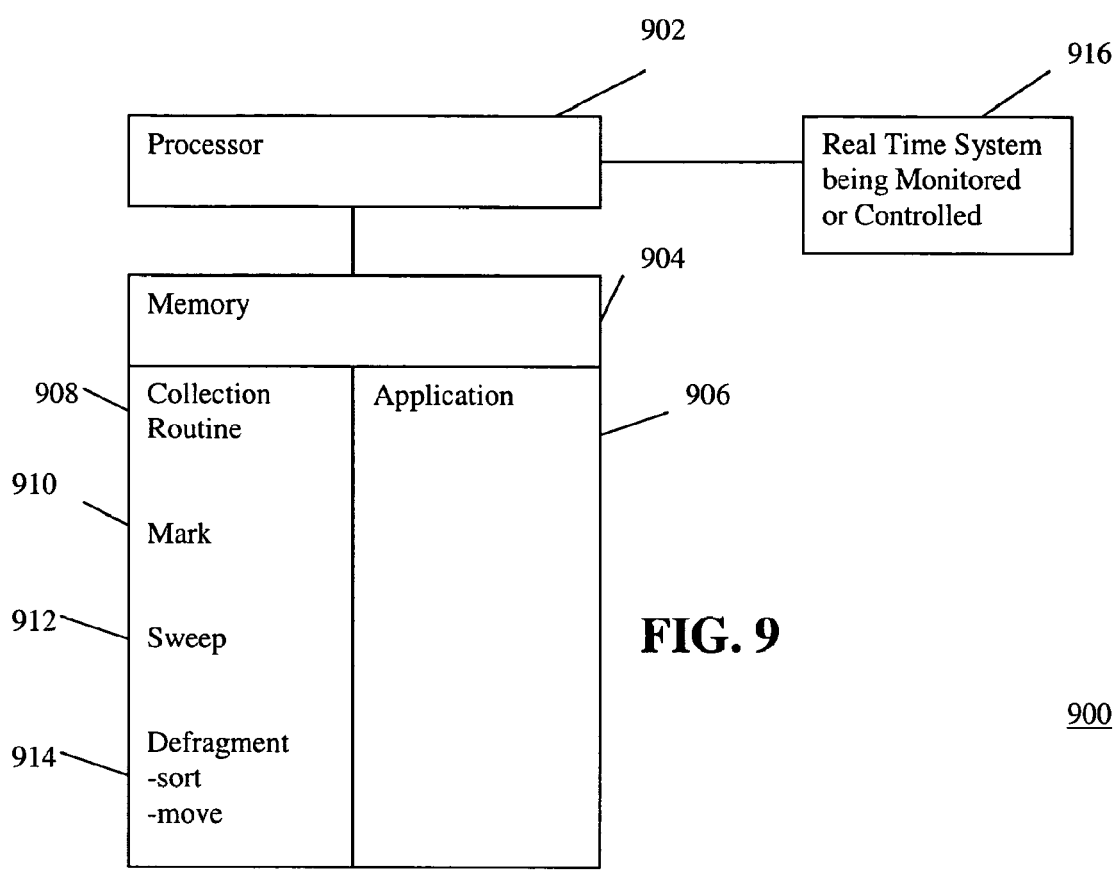
FIG. 9 is a diagram of an implementation of an embodiment of the present invention.

As shown in FIG. 9 a preferred embodiment 900 of the present invention can be implemented in software in a memory 904 that runs on a processor 902. The memory contains programming for an application 906 and a garbage collection process 908. A defragmentation routine 914 is inserted into a mark 910 and sweep 912 garbage collection routine 908. The garbage collection routine 908 includes an eager read barrier that was implemented in an optimizing compiler. The read barrier has been sunk to its point of use such that it is now a forwarding pointer positioned in a header the objects to be accessed and moved in accordance with the real-time application instructions. A null-check for the read barrier is combined with a null-check required by the application. The read barrier is optimized by the compiler using barrier sinking and common sub-expression elimination. The processor 902 interleaves the application 906 with the garbage collection process 908 having the mark 910, sweep 912 and defragmentation 914 routines. The garbage collection process 908 is bounded with respect to the time for collection and the overhead memory space required as described herein. Thus, the invention may be used to insure that an adequate amount of processor 902 capacity and memory is available to properly run the real-time system 916 being controlled or monitored by the processor 902 and application software 906.

Embodiments of the present invention can be implemented on a standard computer system 1000 as shown in FIG. 10. For example, a CD ROM 1001, memory disc 1003 or other computer readable medium may be used to store the software to implement an embodiment. The system 1000 also has a RAM 1002 and a ROM 1004 that can be used to run the software needed to implement the invention. A processor 1006 communicates with the RAM 1002 and the ROM 1004 through a CPU bus 1009 to run the application and access memory as needed. An I/O controller 1008 interfaces through an I/O bus 1020 with a disc drive controller 1012 and removable CD ROM drive 1016 that can receive the memory storage devices 1001 and 1003. An I/O interface 1010 is used to connect the system 1000 to other external devices as needed. A mass storage interface 1014 can be used to interface the system 1000 with a mass memory database 1018 for applications that require extensive amounts of memory.

What has been shown and discussed is a highly-simplified depiction of a programmable computer apparatus. Those skilled in the art will appreciate that other low-level components and connections are required in any practical application of a computer apparatus. Therefore, while there has been described what is presently considered to be the preferred embodiment, it will be understood by those skilled in the art that other modifications can be made within the spirit of the invention.

We claim:

1. A computer program product comprising a computer readable storage medium having computer program code embodied therein for:

allocating memory space for an application as part of a garbage collection process using a read barrier;

segmenting the memory space into a number of pages each of a predetermined size;

dividing the pages into blocks of a plurality of predetermined sizes;

identifying objects to be allocated;

allocating memory for the objects into the blocks of a size class that is the smallest size class that accommodates the object;

marking some of the objects as dead;

removing the objects marked as dead;

optimizing the read barrier using sub-expression elimination, the optimizing comprising:

breaking up the read barrier; and performing a forwarding operation for a quantity used in a loop only once during execution of the loop; and defragmenting a part of the memory by moving the objects wherein a forwarding operation required to move the objects is performed with a read barrier as soon as a quantity to be forwarded is loaded, the part of the memory ranging in size from a fraction of the memory space to the entire memory space; such that overhead costs associated with using the read barrier are minimized.

2. The computer program product of claim 1 wherein the read barrier is an eager read barrier that uses a forwarding pointer, wherein said eager read barrier maintains an invariant such that registers and stack cells always point into to-space.

3. The computer program product of claim 2 wherein the eager read barrier maintains a to-space invariant.

4. The computer program product of claim 2 wherein the forwarding pointer is located in a header of objects accessed and moved by the eager read barrier.

5. The computer program product of claim 2 comprising barrier sinking optimization software for sinking the eager read barrier to its point of use.

6. The computer program product of claim 2 wherein the eager read barrier maintains a to-space invariant.

7. The computer program product of claim 2 wherein the eager read barrier maintains registers and stack cells such that the registers and stack cells always point into to-space.

8. The computer program product of claim 2 wherein the garbage collection process and the real-time application are interleaved on a time-based schedule.

9. The computer program product of claim 2 wherein the garbage collection process and the application are interleaved on a work-based schedule.

10. The computer program product of claim 1 further comprising sinking the read barrier to its point of use.

11. The computer program product of claim 1 wherein the read barrier maintains registers and stack cells such that the registers and always point into to-space.

* * * * *